United States Patent [19]

Szejtli et al.

[11] 4,105,760

[45] Aug. 8, 1978

[54] LOCAL ANAESTHETIC SALTS OF CHONDROITINSULFATE COMPOUNDS

[76] Inventors: József Szejtli, Endrödi Sándor u. 38-40; Éva Dósa, Bimbó u. 131/a, both of Budapest, Hungary, 1026; Edömér Tassonyi, Keszkenö u. 37, Budapest, Hungary, 1138; Ágoston Dávid, Bem rkp. 56, Budapest, Hungary, 1027; Zsuzsanna Nagy née Biró, Határör u. 70/c, Budapest, Hungary, 1122

[21] Appl. No.: 750,851

[22] Filed: Dec. 15, 1976

[30] Foreign Application Priority Data

Dec. 18, 1975 [HU] Hungary .............................. CI 1630

[51] Int. Cl.$^2$ ...................... A61K 31/73; C08B 37/08
[52] U.S. Cl. .................................... 424/180; 536/18; 536/51; 536/54; 536/118; 536/122
[58] Field of Search ................ 536/18, 51, 54, 118, 536/122; 424/180

[56] References Cited

U.S. PATENT DOCUMENTS

| 3,506,642 | 4/1970 | Koh et al. ........................... 536/51 |
| 3,524,847 | 8/1970 | Grotsch et al. ..................... 536/54 |
| 3,719,665 | 3/1973 | Beaufour et al. ................... 536/54 |
| 3,720,659 | 3/1973 | Guiseley et al. .................... 536/52 |

*Primary Examiner*—Johnnie R. Brown
*Attorney, Agent, or Firm*—Hubbell, Cohen, Stiefel & Gross

[57] ABSTRACT

Water-soluble local anaesthetic compounds having sustained effect are prepared by reacting a chondroitin derivative with a basic local anaesthetic compound.

3 Claims, No Drawings

LOCAL ANAESTHETIC SALTS OF CHONDROITINSULFATE COMPOUNDS

The invention relates to new sustained effect local anaesthetic derivatives and the preparation thereof.

The known local anaesthetics do not have a sufficiently prolonged period of action in the case of long surgical operations or in the case of alleviation of local pain. Heretofore, the following methods which do not affect normal blood circulation have been used:

Oily suspensions which often cause nervous lesions, necrosis and inflammation:

the addition of benzyl alcohol has similar disadvantages, the local anaesthetic dissolved in methylsulfoxide is injected (a locally supersaturated solution is formed and the active ingredient precipitates in the form of crystals). The results are uncertain and the experiments were in many cases followed by death, the preparation of colloid solutions; the local anaesthetic is epidurally injected in the form of a solution of the active ingredient in a high molecular weight viscous dextran. The solution of high viscosity forms a tampon in the epidural gap and the diffusion of the active ingredient is thus slower and thus the effect is sustained;

the addition of urea was unsuccessful. See H. Killian: Lokalanästhesie und Localanästhetika (Georg Thieme, Stuttgart, 1959).

The preparation of basic pharmacons, the salts of alginic acid and carboxymethylcellulose are described in Spanish Pat. No. 380,678. The formed products when administered per os no longer have a bad taste and their absorption is slower.

The present invention provides a process for the preparation of water-soluble compounds of the general formula

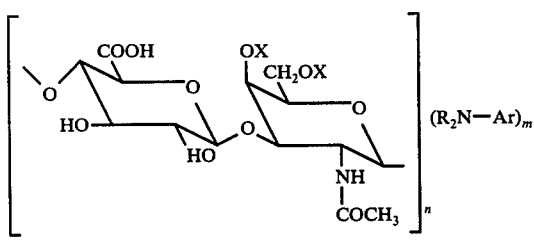

having local anaesthetic activity wherein
$n$ is 10 to 70
$n \leq m \leq 2n$
R is hydrogen or alkyl,
Ar is an aromatic or aliphatic group
comprising reacting a chondroitin-derivative of the general formula

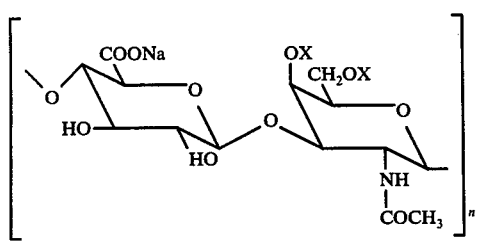

wherein $n$ is as defined above and X is a group of the general formula $-SO_3M$ or $-M-$ wherein M is hydrogen or an alkali metal atom, provided that at least one of the 2 substituents X represents a group of the general formula $-SO_3M-$ with a basic local anaesthetic compound or a salt thereof of the general formula $$R_2N - Ar \qquad (III)$$

wherein R, Ar and $n$ are as defined above and isolating, if desired, the formed compound of the general formula I. The invention also provides the novel compounds of the general formula I.

The invention is based on the observation, that by binding a basic compound having local anaesthetic activity to a chondroitinsulfate polymer — which is a normal component of the living organism, i.e., it is compatible with the organism — by salt-formation, the compound having local anaesthetic activity is released slowly and thus the effect can be increased from 1.5 to 3 fold compared to the span of time of effectiveness of the basic compound, per se.

The biopolymers of the general formula II are generally called chondroitinsulfuric acid derivatives. Compounds wherein M represents a hydrogen atom are chondroitinsulfuric acids and the compounds wherein M represents an alkali metal atom are called chondroitinsulfates. According to the invention chondroitinsulfuric acid derivatives containing a sulfonic acid group in the 4- and/or 6-position of the molecule or a salt thereof may be used.

Chondroitinsulfuric acid derivatives of various types, molecular weight and polydispersity may be used in the process. The following chondroitinsulfuric acid derivatives can preferably be used:

The following compounds are macromolecular acids and contain in each polysaccharide unit a carboxylic group and one or two sulfonic acid or sulfate groups.

(a) chondroitinsulfate —A (molecular weight: 5000–32000 sulfuric acid content 4.8–6.1 %, nitrogen content: 2.78–2.90 %, uronic acid content: 32.0–34.9 %, amino acid content 0.1 %);

(b) chondroitinsulfate —C (molecular weight: 5000–32,000, sulfuric acid content: 4.8–6.1 %, nitrogen content: 2.78–2.9 %, uronic acid content: 32.0–34.9 %, amino acid content: 0.1 %);

(c) chondroitinpolysulfate (molecular weight: 6000–36,000, sulfur content 6.1–10.3 %, nitrogen content: 2.03–2.78 %, uronic acid content: 20.0–34.9 %, amino acid content: 0.1 %).

Characteristic IR absorption bands of chondroitinsulfate A are observed at 855 cm$^{-1}$, of chondroitinsulfate C: at 820 cm$^{-1}$, and of chondroitinpolysulfate: at 850 cm$^{-1}$.

The basic compounds having local anaesthetic activity are benzoic acid esters, p-amino-benzoic acid esters or amides. The following basic local anaesthetic compounds and salts thereof are preferred: benzoic acid esters, such as:

(−)-3β-Benzoyloxytropane-2β-carboxylic acid methyl ester;
2-(Cyclohexylamino)-1-methyl-ethyl-benzoate,
3-(2-Methyl-piperidino)-propyl-benzoate,
2-(Diethylaminoacetylamino)-3-methyl-benzoic acid methyl ester;
p-aminobenzoic acid esters, such as:
4-Amino-2-chloro-benzoic acid-β-diethylaminoethylester, 4-Amino-benzoic acid-β-diethylaminoethylester,
4-Butylamino-benzoic acid-β-diethylaminoethylester (Tetracaine),
n-Butylamino-2-chloro-6-methyl-acetanilide,
4-Amino-3-butoxy-benzoic acid-β-diethylaminoethylester; and amides such as:
N-(2-Diethylaminoethyl)-2-butoxy-cinconinamide,
α-Diethylamino-2,6-dimethyl-acetanilide (Lidocaine),
1,2′,6′-trimethyl-pipecolin anilide,
2-Methyl-α-propylamino-propionanilide,
1-n-Butyl-2′,6′-dimethyl-pipecolinalide (Bupivacaine Marcaine).

The acid addition salts of the local anaesthetic bases of the general formula III formed with acids may also be used. The salts of inorganic acids, such as hydrochloric acid, hydrogen bromide or sulfuric acid are preferred.

According to one preferred embodiment of the present invention, chondroitinsulfuric acid derivatives of the general formula II wherein M is hydrogen may be used. These compounds can be released from the compounds of the general formula II containing an alkali metal atom, i.e., wherein M is preferably sodium, by using ion exchange resins. Strong acid, such as phenol- or polystyrene-based resins are preferred.

The following phenol-based resins are preferably employed: Dvolite C3, Katex FN, Lewatit PN, Wofatit F, etc. Polystyrene-based resins, such as Amberlite IR-120, —IR-122, —IR-124, Dowex 50, Varion KS, Kationit KV 2, Duolit C20, etc., can be used. The chondroitinsulfuric acid is preferably released from its salt in an aqueous medium on a cation-exchange column or by mixing the chondroitinsulfate with the ion-exchange resin.

According to the process of the present invention the chondroitinsulfate or the chondroitinsulfuric acid of the general formula II is reacted with the basic local anaesthetic compound in a homogeneous or heterogeneous phase and the thus formed compound is isolated, if desired. The active part of the basic compound of local anaesthetic activity may be a secondary or tertiary amino group in the case of aliphatic or aromatic compounds or the basic ring nitrogen in the case of heterocyclic compounds.

The basic local anaesthetic compound may be used in solid form or in the form of a solution with water-inmiscible organic solvents or with water miscible organic solvents. As a reaction medium, there is preferably used water, an alcohol, preferably methanol or ethanol, an aromatic hydrocarbon, such as benzene or toluene, chloroform or ether.

The course of the reaction is preferably monitored by measuring the pH; and the solution of the local anaesthetic base is added to the chondroitinsulfuric acid or to the sulfate until the solution becomes neutral.

The formed compounds of the general formula I are isolated from the reaction mixture by methods generally known in the art. The reaction product may be precipitated with an organic solvent, such as alcohol or acetone after the evaporation of the reaction mixture. According to another method, the isolation may be carried out by lyophilization.

The compounds of the invention exhibit, apart from the features of the local anaesthetic base, the following advantageous properties:

(a) The duration of action is considerably longer than that of the water-soluble salt formed from the local anaesthetic substance and an inorganic acid. This fact is of extraordinary importance in case of the widely used local anaesthetics (Lidocaine, Marcaine, etc.).

(b) The solubility of the new compound is changed, and thus its absorption rate is also improved.

(c) A programmed absorption can be achieved by buffering the aqueous solution of the macromolecular anaesthetic salt and the salt mixture formed from a lower molecule inorganic acid, in the way that the salt of the pharmacon formed with a lower molecule acid acts readily whereas the condroitinsulfate salt acts successively in a rate determined by the dissociation of the macromolecular salt and by the rate of the enzymatic degradation of chondroitinsulfate.

The compounds of the present invention can be used for the achievement of sustained effect of the pharmaceutically injectable compositions in the case of operations and of lasting alleviation of pain.

The compositions may be prepared in the form of the conventionally used solid or liquid carriers and adjuvants. The compositions are preferably formulated in lyophilized state, in a powder ampoule and can be dissolved in water or in a suitable solvent prior to injection. The advantage of the composition is in the preparation thereof from non-toxic components in a simpler manner and a prolonged anaesthetic effect can be achieved. The effect lasts 1.5-3 times longer than when using the known local anaesthetic salts.

The details of the present invention are further illustrated in the following non-limiting Examples:

EXAMPLE 1

The preparation of chondroitinsulfate A-lidocaine salt

To a solution (10 ml.) of 200 mg. of the sodium salt of CSA (chondroitinsulfuric acid-A) exchanged on ion exchanger resin Dowex 50 × 8 H$^+$, is a 5 % alcoholic solution of Lidocaine is slowly added dropwise under stirring. The reaction is monitored by a pH-meter. The addition is completed when the pH is neutral and the solution is evaporated at 50° C in vacuo to give a residue of about 1 ml. On the addition of 15 ml. of anhydrous alcohol, a translucent gelatinous substance is precipitated. The substance is filtered in vacuo on a Buchner funnel, washed with alcohol (to remove the excess lidocaine) dried with acetone and then with ether. Yield: 75 %. Decomposition at 190° to 195° C, no melting point can be determined. Ash-content: < 1.5 %. 40 to 45 % of the product is lidocaine (corresponding to a molar ratio of 1.2 lidocaine/CS acid disaccharide unit).

Pharmacological tests

The effect of CS-lidocaine was tested in adult albino rats. The mean weight of the animals was 200 ±10 g. The activity of CS-lidocaine was compared with the activity of a 2 % adrenaline-free lidocaine solution. The concentration of the CS-lidocaine solution corresponds also to 2 % lidocaine content.

A dose curve was plotted in the case of both compounds by injecting 0.1, 0.2, 0.3, 0.4, 0.5 and 0.6 ml. of solution.

Half of these doses were injected on one side of the tail-base of the rat and the other half were injected on the other side. The effect of each dose of the CS-lidocaine and of the 2 % lidocaine was tested in 10 animals.

During the test, the animals were closed in a box, with only tails exposed. The tails were subjected to an electric impulse and thus pain was induced. The impulses are generated by a peripherical nerve-stimulator. The impulse was characterized by an intensity of 25 mA, frequency of 200 Hz, duration of 2 sec. On the impulse the unanaestethized animals indicated severe pain by pulling away their tails. The time until the pain ceased and returned was measured.

The results were statistically evaluated and were summarized in the following table:

Mean values of duration of the effect (in hours) in the case of local anaesthetic agents in various amounts

| ml. | Lidocaine HCl 2 % | Lidocaine-CS 2 % lidocaine |
| --- | --- | --- |
| 0.3 | 2.5 ± 0.3 | 3.0 ± 0.3 |
| 0.4 | 3.0 ± 0.4 | 4.0 ± 0.4 |
| 0.5 | 4.0 ± 0.2× | 6.0 ± 0.5× |
| 0.6 | 4.0 ± 0.3× | 7.0 ± 0.3× |

×The duration of effect of Lidocaine HCl and Lidocaine-CS of the same dose is significantly different, $p < 0.01$.

Toxicology: The toxicology of the known anaesthetics and of chondroitinsulfate is known.

Concerning the toxicology of the condroitinsulfate see L.M. Morrison, O. Arne Schjeide: Coronary Heart Disease and the Mucopolysaccharides (glycosaminoglycans) Springfield (U.S.A.) Charles C. Thomas 1974.

EXAMPLE 2

The preparation of chondroitinsulfate A-lidocaine salt 8.5 g. of the sodium salt of CSA were dissolved in 30 ml. of water. The highly viscous solution was diluted to 100 ml. and the solution was placed on a Dowex 50 × 8 H+ ion exchange column (the volume of the resin is 100 ml.). The exchanged CSA (total 270 ml. of the solution pH = 1.4) was shaken out in a shaking funnel with a solution of 11 g. of lidocaine and 75 ml. of benzene. The slightly milky mixture separated slowly and the pH of the aqueous layer was 5–6. The aqueous layer was evaporated at 50° C in vacuo to give a residue of 20–25 ml., whereafter the mixture was evaporated nearly to dryness under an infrared lamp. The thereby obtained sticky substance was thoroughly pulverized with 3×100 ml. of anhydrous alcohol, filtered, washed with 2×50 ml. of alcohol and dried with acetone and ether. 10.5 g. of white powder were obtained. Lidocaine content: 40–45 %. Decomposition at 190° to 195° C. Ash content: < 1.5 %.

EXAMPLE 3

The preparation of chondroitinsulfate A-lidocaine salt 1 g. of the sodium salt of CSA is converted to CSA acid on a Dowex 50×8 H+ ion exchange column and 900 mg. of lidocaine were added to 50 ml. of the solution. The reaction mixture was stirred for 2 hours at room temperature. During this time the pH of the solution was raised to 7 to 7.5. The excess lidocaine was removed by filtration, the filtrate was evaporated at 50° C to give a residue of 3 to 4 ml. On the addition of 50 ml. of anhydrous alcohol the viscous, somewhat turbid solution become swollen and translucent and have a gelatinous structure. The solution was filtered, washed with alcohol, dried with acetone and ether. A white powder was obtained, yield: 70 %, lidocaine-content: 45 %.

EXAMPLE 4

The preparation of chondroitinsulfate A-(or C)lidocaine salt

The title compound was prepared according to Example 2, except that the salt was obtained from a solution containing about 20 % of dry substance by lyophilization. The yield was better and the lidocaine content of the product was 40 to 45%.

EXAMPLE 5

The preparation of chondroitinsulfate C-lidocaine salt 1 g. of the sodium salt of CSC was converted to CSC acid on a Dowex 50 × 8 H+ ion exchange column and a mixture of 2 g. of lidocaine and 40 ml. of ether were added to the solution of about 20 ml. The mixture was shaken out in a shaking funnel and the aqueous layer was evaporated nearly to dryness. The residue was pulverized under 50 ml. of anhydrous alcohol, filtered, washed with alcohol, dried with acetone and with a small amount of ether. White powder was obtained. Yield: 75 %, lidocaine content: 40 %.

The lidocaine salt was prepared from chondroitinsulfate C according to the methods described above and the yield and analytical data were substantially identical with those of CSA.

EXAMPLE 6

Preparation of the salt of chondroitinpolysulfate-lidocaine

Lidocaine salt was prepared from chondroitinpolysulfate (sulfate content: 21–28 %) containing sulfate groups in the 5- and 6-positions by methods described above, but a greater excess of lidocaine was used. The lidocaine content of the product, depending on the degree of sulfatization was 45 to 75 %.

EXAMPLE 7

Preparation of the salt of chondroitinsulfate A or C-marcaine (dl-1-butyl-2′,6′-dimethyl-pipecolinanilide) salt 400 mg. of 1-n-butyl-2′,6′-dimethyl-pipecolinanilide were dissolved in ether and the solution shaken out with an aqueous solution containing 320 mg. of chondroitinsulfuric acid. The product was obtained from the aqueous layer after achieving a suitable dry substance content by evaporation at 50° C in vacuo, by precipitating the product with acetone. 300 mg. of the product containing 38–40 % of 1-butyl-2′,6′-dimethyl-pipecolinanilide were obtained.

EXAMPLE 8

Preparation of chondroitinsulfate (A or C) resp. chondroitinpolysulfate-tetracaine salt Reacting an aqueous solution of the sodium salt of chondroitinsulfate (A or C) or chondroitinpolysulfate with an excess of an aqueous solution of Tetracaine-hydrochloride at room temperature, chondroitinpolysulfate-tetracaine-hydrochloride salt was obtained in the form of a finely divided precipitate. The product was further worked up by lyophilization and the excess tetracaine-hydrochloride was removed by alcohol. The tetracaine-content of the obtained product was 41 to 75 %, depending on the degree of sulfatization of the polysaccharide and on the molecular weight.

EXAMPLE 9

Preparation of chondroitin-lidocaine sulfate lyophilized powder ampoule 100 g. of chondroitin-lidocaine-sulfate (decomposition at 190° to 195° C, lidocaine content 45 %) were dissolved under stirring in 1000 cm³ of injectable distilled water at room temperature. The solution was filtered under sterile conditions on G-5 sintered glass. The solution was filled in 5 ml. portions into powder ampoules. The solution was frozen, cooled to below −27° C under the eutectic point, whereafter it was dried in vacuo, according to cryodehydration techniques. The final drying was carried out at 35° C for 3 hours. The lyophilized ampoules were sealed with closing devices by methods generally known and ampoules of 5 ml. containing injectable distilled water were obtained.

What we claim is:

1. A chondroitinsulfate compound of the formula:

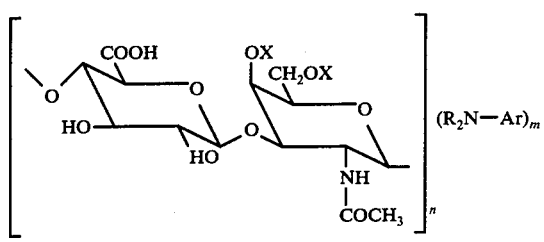

wherein $n$ is 10 to 70; $m$ is $n$ to $2n$; X is —SO$_3$M or —M in which M is hydrogen or an alkali metal, provided that at least one X group is —SO$_3$M; and (R$_2$N—Ar) represents a compound selected from the group consisting of (−)-3β-benzoyloxytropane-2β-carboxylic acid methyl ester,
2-(cyclohexylamino)-1-methyl-ethyl-benzoate,
3-(2-methyl-piperidino)-propylbenzoate,
2-(diethylaminoacetylamino)-3-methyl-benzoic acid methyl ester,
4-amino-2-chloro-benzoic acid-β-diethylaminoethyl ester,
4-amino-benzoic acid-β-diethylaminoethyl ester,
4-butylamino-benzoic acid-β-diethylaminoethyl ester,
n-butylamino-2-chloro-6-methyl-acetanilide,
4-amino-3-butoxy-benzoic acid-β-diethylaminoethyl ester,
N-(2-diethylaminoethyl)-2-butoxy-cinconinamide,
α-Diethylamino-2,6-dimethyl-acetanilide,
1,2′,6′-trimethyl-pipecolinanilide,
2-methyl-α-propylamino-propionanilide and
1-n-butyl-2′,6′-dimethyl-pipecolinanilide.

2. A local anaesthetic pharmaceutical composition comprising an effective amount of a compound according to claim 1 and an inert, pharmaceutically acceptable solid or liquid carrier.

3. A salt of a compound selected from the group consisting of chondroitinsulfate A, chondroitinsulfate C and chondroitinpolysulfate and a base selected from the group consisting of α-diethylamino-2,6-dimethylacetanilide, 1-n-butyl-2′,6′-dimethyl-pipecolinanilide and the hydrochloride thereof.

* * * * *

UNITED STATES PATENT OFFICE
CERTIFICATE OF CORRECTION

Patent No. 4,105,760          Dated August 8, 1978

Inventor(s) Jozsef Szejtli et al

It is certified that error appears in the above-identified patent and that said Letters Patent are hereby corrected as shown below:

Column 1, line 53: "n≦ m≦ 2n" should read -- $n \leq m \leq 2n$ --.

Column 3, lines 49-50: "water-inmiscible" should read -- water-immiscible --.

Column 4, line 13: "condroitinsulfate" should read -- chondroitinsulfate --; line 39: "50 x 8 $H^+$, is" should read -- 50 x 8 $H^+$, --.

Column 5, line 7: "unanaestethized" should read -- unanaesthetized --; line 26: "condroitinsulfate" should read -- chondroitinsulfate --; line 64: "become" should read -- became --; same line: "have" should read -- had --.

Signed and Sealed this

Twenty-second Day of May 1979

[SEAL]

Attest:

RUTH C. MASON
*Attesting Officer*

DONALD W. BANNER
*Commissioner of Patents and Trademarks*